(12) United States Patent
Endo

(10) Patent No.: US 11,715,442 B2
(45) Date of Patent: Aug. 1, 2023

(54) SEMICONDUCTOR APPARATUS WITH OSD FUNCTION

(71) Applicant: ROHM CO., LTD., Kyoto (JP)

(72) Inventor: Hiroharu Endo, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 75 days.

(21) Appl. No.: 17/376,564

(22) Filed: Jul. 15, 2021

(65) Prior Publication Data

US 2022/0005435 A1 Jan. 6, 2022

Related U.S. Application Data

(63) Continuation of application No. PCT/JP2019/051189, filed on Dec. 26, 2019.

(30) Foreign Application Priority Data

Jan. 21, 2019 (JP) .................................. 2019-008003

(51) Int. Cl.
  *G09G 5/02* (2006.01)
  *G09G 3/20* (2006.01)
  (Continued)

(52) U.S. Cl.
  CPC .............. *G09G 5/026* (2013.01); *B60K 35/00* (2013.01); *G09G 3/20* (2013.01); *G09G 5/30* (2013.01); *B60K 2370/167* (2019.05); *B60K 2370/52* (2019.05); *G09G 2310/0275* (2013.01); *G09G 2310/08* (2013.01); *G09G 2340/10* (2013.01);
  (Continued)

(58) Field of Classification Search
  CPC .......... G09G 5/026; G09G 5/30; G09G 5/024; G09G 5/26; G09G 5/28; G09G 5/003; G09G 5/243; G09G 5/14; G09G 3/20; G09G 2310/0275; G09G 2310/08; G09G 2340/10; G09G 2340/125; G09G 2380/10; G09G 2360/04; G09G 2370/08;
  (Continued)

(56) References Cited

U.S. PATENT DOCUMENTS

2008/0111882 A1* 5/2008 Tsai ................... H04N 21/4312
 348/115
2010/0079489 A1* 4/2010 Cheng .................. G11B 27/034
 345/522

(Continued)

FOREIGN PATENT DOCUMENTS

CN 101115935 A 1/2008
CN 101493111 A 7/2009
(Continued)

OTHER PUBLICATIONS

PCT International Preliminary Report on Patentability with Written Opinion of the International Searching Authority for International Application No. PCT/JP2019/051189; dated Jul. 29, 2021.
(Continued)

*Primary Examiner* — Brent D Castiaux
(74) *Attorney, Agent, or Firm* — Cantor Colburn LLP

(57) ABSTRACT

A video input interface receives video data. An OSD circuit draws an intermediate layer in a target region in which an OSD character is to be overlaid on the video data, and overlays the OSD character on the intermediate layer.

14 Claims, 13 Drawing Sheets

(51) Int. Cl.
*G09G 5/30* (2006.01)
*B60K 35/00* (2006.01)
(52) U.S. Cl.
CPC ... *G09G 2340/125* (2013.01); *G09G 2380/10* (2013.01)
(58) Field of Classification Search
CPC .............. B60K 35/00; B60K 2370/167; B60K 2370/52; G06F 3/147
See application file for complete search history.

(56) References Cited

U.S. PATENT DOCUMENTS

| | | | | |
|---|---|---|---|---|
| 2016/0093242 A1* | 3/2016 | Kim | .................. | H04N 5/44504 345/589 |
| 2017/0154605 A1* | 6/2017 | Kajita | .................... | B60K 37/02 |

FOREIGN PATENT DOCUMENTS

| | | | |
|---|---|---|---|
| CN | 101922527 | A | 12/2010 |
| DE | 1575983 | B2 | 2/1970 |
| JP | H06317782 | A | 11/1994 |
| JP | H08102895 | A | 4/1996 |
| JP | 2002169524 | A | 6/2002 |
| JP | 2003259213 | A | 9/2003 |
| JP | 2008259206 | A | 10/2008 |
| JP | 2010068399 | A | 3/2010 |
| JP | 2012194561 | A | 10/2012 |
| JP | 2012230658 | A | 11/2012 |
| KR | 1020090054153 | A | 5/2009 |
| WO | 2008041270 | A1 | 4/2008 |
| WO | 2018003669 | A1 | 1/2018 |

OTHER PUBLICATIONS

International Search Report for International Application No. PCT/JP2019/051189; dated Mar. 17, 2020.
Notice of Reasons for Refusal corresponding to JP Application No. 2020-568044; dated Oct. 18, 2022.
CNOA Second Office Action for correspodning CN Application No. 201880015850.5; dated Apr. 1, 2020.
JPO Notice of Reasons for Refusal for corresponding JP Application No. 2020-568044; dated Jun. 28, 2022.

* cited by examiner

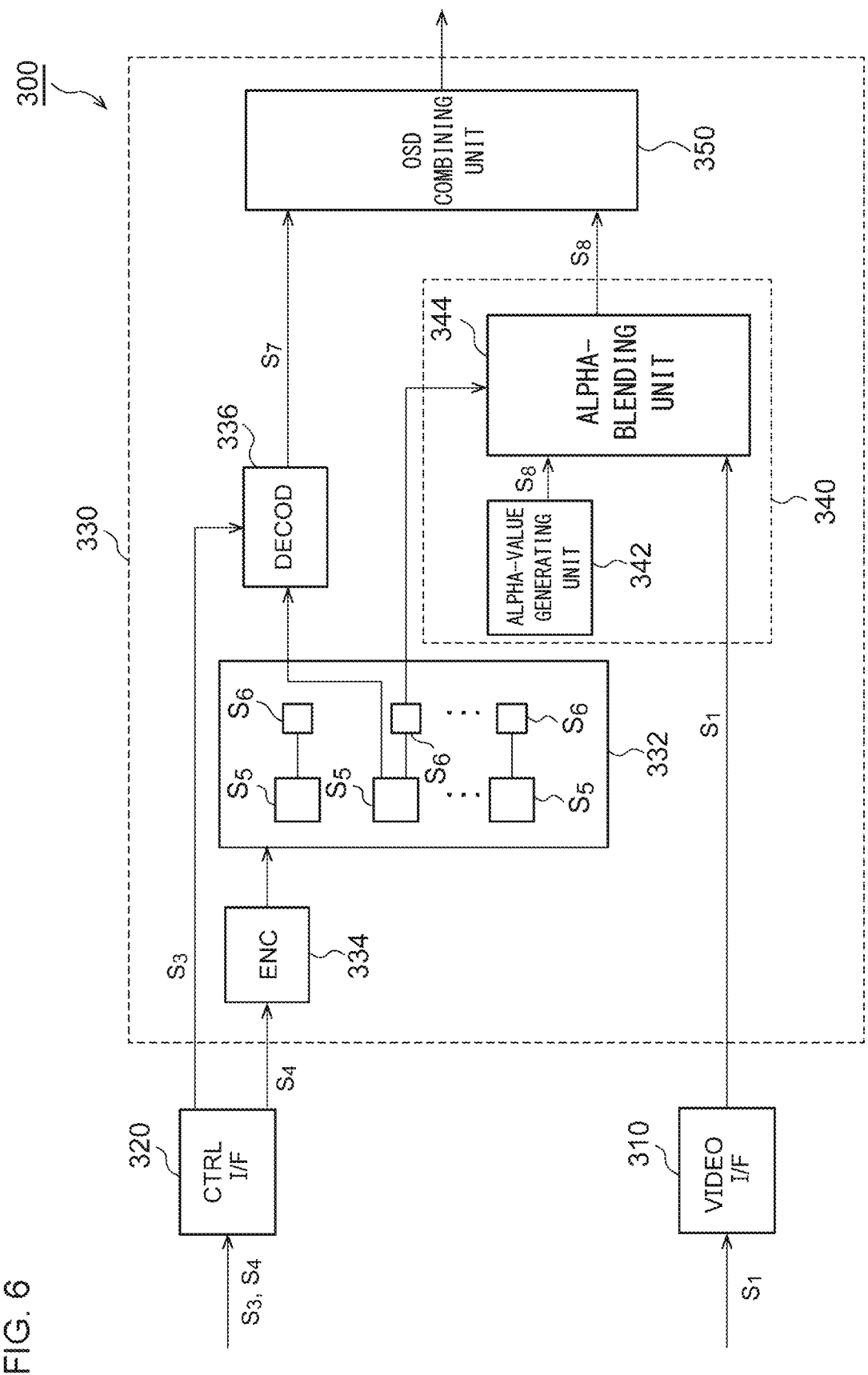

FIG. 8  Gaussian Filter (IIR radius=15)

SEMICONDUCTOR APPARATUS WITH OSD FUNCTION

CROSS-REFERENCE TO PRIOR APPLICATIONS

This application is a continuation under 35 U.S.C. § 120 of PCT/JP2019/051189, filed Dec. 26, 2019, which is incorporated herein reference and which claimed priority to Japanese Application No. 2019-008003, filed Jan. 21, 2019, the entire content of which is hereby incorporated by reference.

BACKGROUND

Technical Field

The present disclosure relates to a semiconductor apparatus including an interface for a digital video signal.

Description of the Related Art

FIG. 1 is a block diagram showing an image display system. An image display system 100R includes a display panel 102 configured as a liquid crystal panel, organic EL panel or the like, a gate driver 104, a source driver 106, a graphics controller 110, and a timing controller 200R. The graphics controller 110 generates image data to be displayed on the display panel 102. The image data includes pixel (RGB) data, which is to be transmitted in a serial format to the timing controller 200R.

The timing controller 200R receives the image data, and generates various kinds of control/synchronization signals. The gate driver 104 sequentially selects scanning lines Ls of the display panel 102 in synchronization with a signal received from the timing controller 200R. Furthermore, the RGB data is supplied to the source driver 106.

The timing controller 200R includes a reception circuit 202, a transmission circuit 204, and a logic circuit 210. The reception circuit 202 receives the image data transmitted in a serial format from the graphics controller 110. ROM 111 configured as an external component stores identification (ID) information, resolution information, refresh rate information, etc., with respect to the display panel 102. The logic circuit 210 generates a control/synchronization signal based on the image data received by the reception circuit 202. The transmission circuit 204 outputs the control signal and the image data to the gate driver 104 and the source driver 106.

In some cases, in addition to a function of displaying the image data received by the reception circuit 202, the timing controller 200R is required to have an on-screen display (OSD) function for displaying predetermined characters, figures, icons, etc. In order to satisfy such a need, the logic circuit 210 includes an OSD circuit 212. Such characters, figures, icons, etc., will collectively be referred to as OSD characters hereafter.

The ROM 111 stores bitmap data of several OSD characters. The timing controller 200R reads, from the ROM 111, bitmap data of an OSD character that corresponds to a control signal input in addition to the image data. The timing controller 200R displays the bitmap graphics data on the display panel 102.

FIG. 2A is a diagram showing an example of an OSD character. FIG. 2B is a diagram showing a state in which an OSD character is overlaid on the image data. As shown in FIG. 2B, in some cases, a significant degradation occurs in the visibility of an OSD character depending on the relation between the color and the brightness of the OSD character and the color and the brightness of the underlying image data.

In order to solve this problem, in some cases, the timing controller is configured to support a visibility detection function. The visibility detection function is configured as a function of detecting the difference in color or brightness between an OSD character and the background so as to judge the visibility of the OSD character. The graphics controller 110 is notified of the judgement result. When judgment has been made that the OSD character has poor visibility, the graphics controller 110 side is required to handle the situation.

SUMMARY

The present disclosure has been made in order to solve such a problem.

An embodiment of the present disclosure relates to a semiconductor apparatus having a function of transmitting an image. The semiconductor apparatus includes: a video input interface structured to receive video data; an OSD (On Screen Display) circuit structured to draw an intermediate layer in a target region in which an OSD character is to be overlaid on the video data, and to overlay the OSD character on the intermediate layer.

It should be noted that any combination of the components described above or any manifestation thereof may be mutually substituted between a method, apparatus, and so forth, which are also effective as an embodiment of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is a block diagram showing an example configuration of an OSD circuit;

FIG. 8 is a diagram showing an example of the alpha-value distribution of a reference region;

DETAILED DESCRIPTION OVERVIEW OF THE EMBODIMENTS

Figure 1:
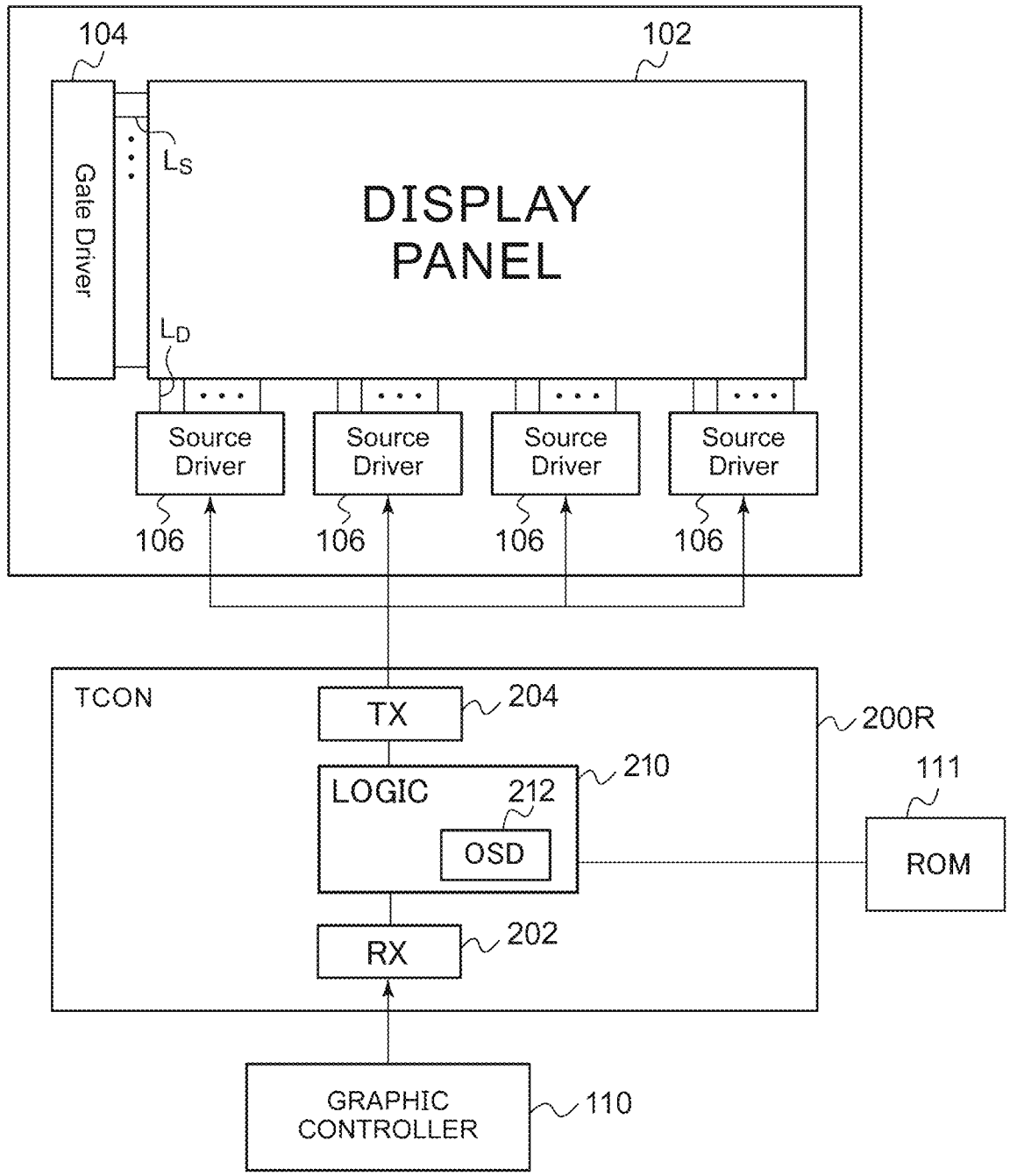
FIG. 1 is a block diagram showing an image display system.
Figure 2A:
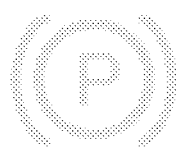
FIG. 2A is a diagram showing an example of an OSD character.
Figure 2B:
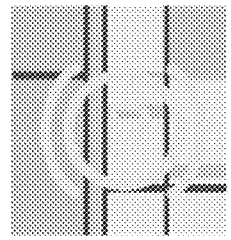
FIG. 2B is a diagram showing a state in which the OSD character is overlaid on image data.

An embodiment disclosed in the present disclosure relates to a semiconductor apparatus. The semiconductor apparatus includes: a video input interface structured to receive video data; an OSD (On Screen Display) circuit structured to draw an intermediate layer in a target region in which an OSD character is to be overlaid on the video data, and to overlay the OSD character on the intermediate layer.

With an arrangement in which the OSD circuit of the semiconductor apparatus is configured to support a function of inserting an intermediate layer, such an arrangement is capable of hiding the background, thereby providing improved visibility of the OSD character.

Also, the OSD circuit may draw the intermediate layer using alpha blending.

Also, the OSD circuit may include an alpha-value generating unit structured to generate a distribution of alpha values to be applied to the target region. The alpha-value distribution may be designed such that the transparency level becomes higher closer to the outer circumferential portion of the target region.

Also, the target region may include: a non-blur region positioned at a central position of the target region and in which the alpha value is designed to be constant; and a blur region arranged such that it surrounds the non-blur region, and the alpha value becomes smaller closer to an outer circumferential portion thereof. In this case, the non-blur region may be designed to have a variable size. Such an arrangement is capable of supporting OSD characters having different sizes.

Also, the alpha-value generating unit may generate the alpha-value distribution of a reference region positioned at a first corner of the blur region. Also, the alpha-value generating unit may generate the alpha-value distribution for each of the remaining three corners of the blur region based on the alpha-value distribution of the reference region. This allows an amount of calculation to be reduced.

Also, the alpha-value generating unit may generate the alpha-value distribution by multiplying column data and row data, and by dividing a product thereof by a predetermined value. This requires only the column data and the row data to be held. Such an arrangement allows the memory capacity to be reduced as compared with an arrangement in which the alpha values are held for all the pixels in the target region.

Also, the predetermined value may be $2^k$ ($k \geq 2$). Also, the division may be configured as a k-bit shift. This allows the function to be implemented in a simple manner by means of a hardware component.

Also, the alpha-value distribution may be designed so as to be horizontally symmetrical and/or vertically symmetrical. With this, after only a portion of the alpha value distribution is reproduced, the alpha value distribution can be generated for the remaining portions by reversal or rotation.

Also, the alpha-value distribution of the blur region may be configured as a Gaussian distribution. This allows the intermediate layer to be smoothly combined with the background.

The color of the intermediate layer may be selected according to the OSD character to be overlaid on the intermediate layer. This allows the color of the intermediate layer to be set appropriately for each OSD character.

Also, the OSD character may be supplied from an external component in a setup operation of the semiconductor apparatus.

The OSD character may be designed to have appended data of the color of the intermediate layer on which the OSD character is to be overlaid. The color of the intermediate layer may be embedded at a predetermined pixel positioned in a margin portion of the bitmap data of the OSD character.

Embodiments

Description will be made below regarding preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

Figure 3:
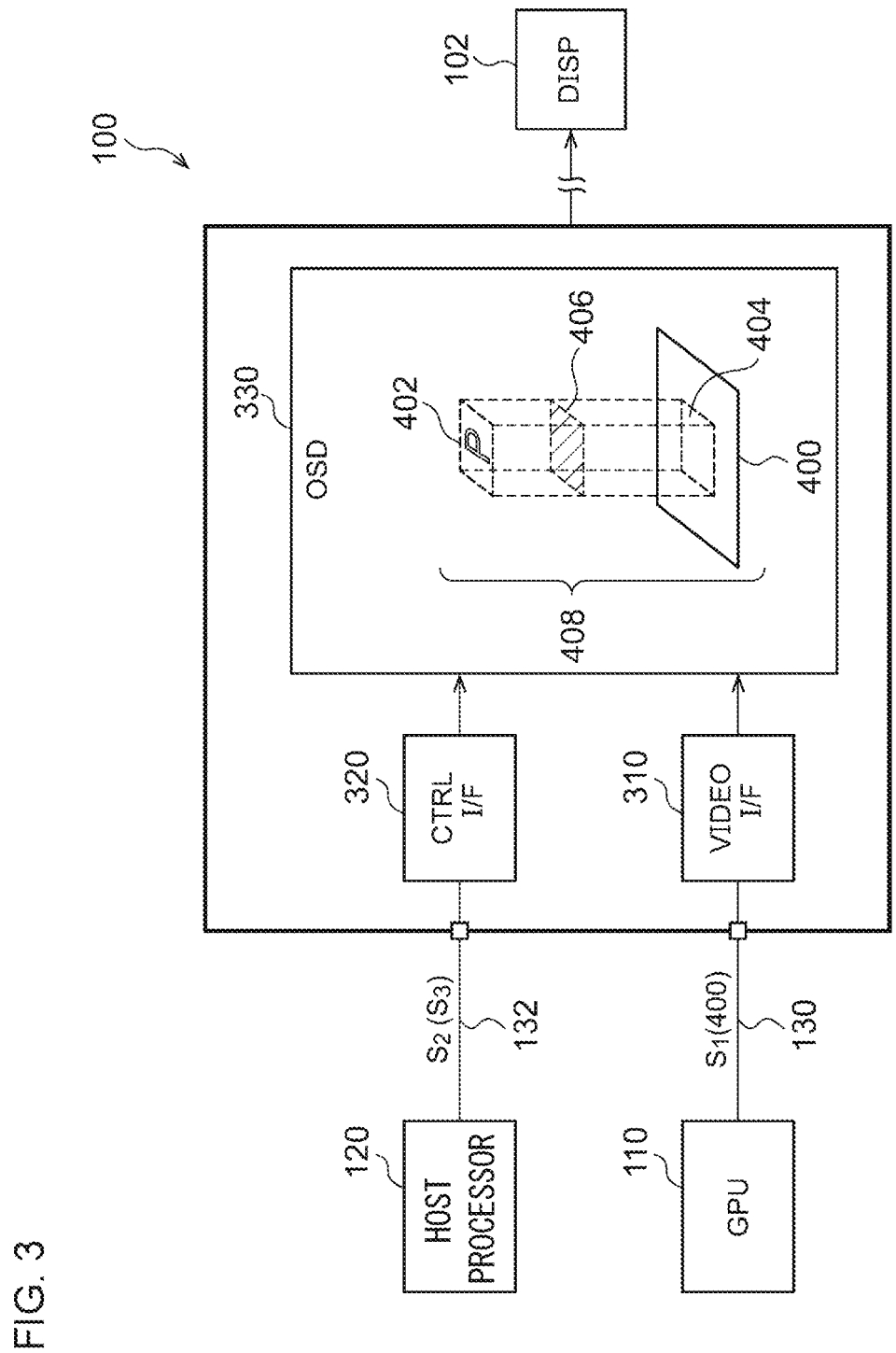
FIG. 3 is a block diagram showing an image display system provided with a semiconductor apparatus according to an embodiment.

FIG. 3 is a block diagram showing an image display system 100 including a semiconductor apparatus 300 according to an embodiment. The image display system 100 includes the semiconductor apparatus 300, a display panel 102, a graphics controller 110, and a host processor 120.

The graphics controller 110 is configured as a Graphics Processing Unit (GPU) or the like, and generates video data 400. The graphics controller 110 includes a transmitter (video output interface) that conforms to the HDMI (trademark) standard, DisplayPort standard, or Digital Visual Interface (DVI) standard. The graphics controller 110 is coupled to the semiconductor apparatus 300 via a video transmission line 130. A digital video signal $S_1$ including the video data 400 is transmitted in a serial format to the semiconductor apparatus 300.

The host processor 120 integrally controls the image display system 100. The host processor 120 and the semiconductor apparatus 300 are coupled via a control line 132 that differs from the video transmission line 130. As the control line 132, an I²C interface or SPI may be employed. The graphics controller 110 and the host processor 120 may be integrated.

The semiconductor apparatus 300 includes a video input interface 310, a control input interface 320, and an OSD circuit 330. The video input interface 310 receives a digital video signal $S_2$ from the graphics controller 110.

The control input interface 320 receives, from the host processor 120, the control data $S_2$ that relates to the OSD. For example, the control data $S_2$ includes a display command $S_3$ that is an instruction to display the OSD character 402.

The OSD circuit 330 loads the data of the OSD character 402 from unshown memory according to the display command $S_3$. The memory may store the OSD character data in compressed form. In this case, the OSD circuit 330 decodes the OSD character.

The OSD circuit 330 draws an intermediate layer 406 on a target region 404 on which the OSD character 402 is to be overlaid in a target region 404 of the video data 400. Furthermore, the OSD character 402 is overlaid on the intermediate layer 406.

The image data 408 on which the OSD character 402 is overlaid is transmitted to an unshown driver. Finally, the OSD character 402 is displayed on the display panel 102.

The above is the configuration of the image display system 100. Next, description will be made regarding the operation of the image display system 100.

Figure 4A:
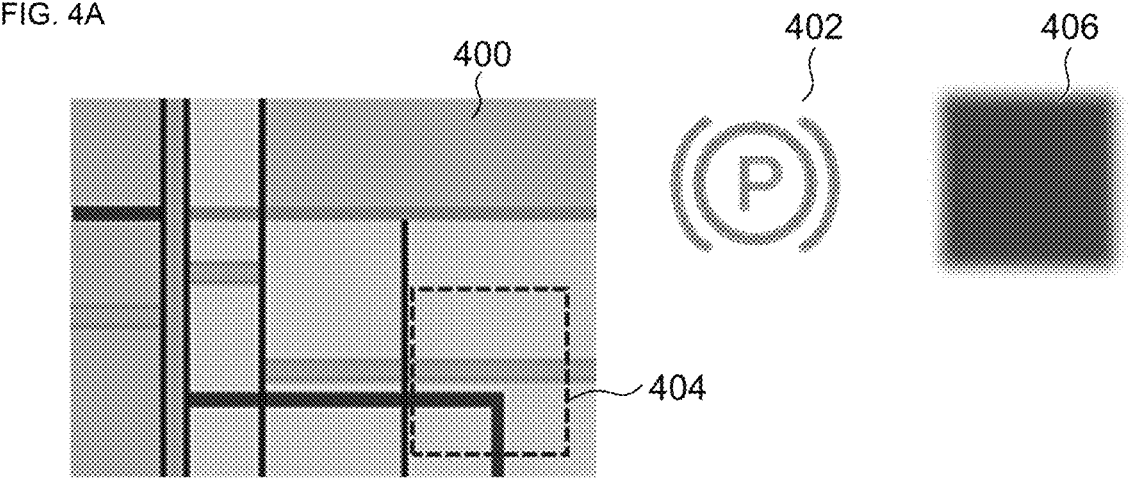
FIG. 4A-FIG. 4C are diagrams for explaining the generation of image data by the semiconductor apparatus shown in FIG. 3.
Figure 4B:
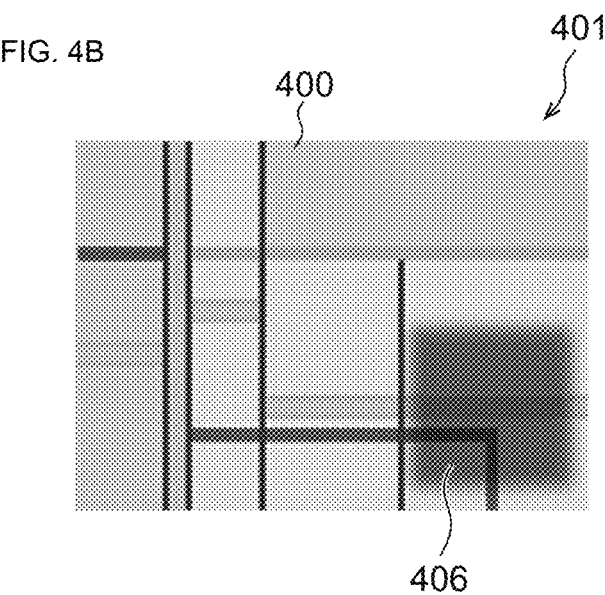
Figure 4C:
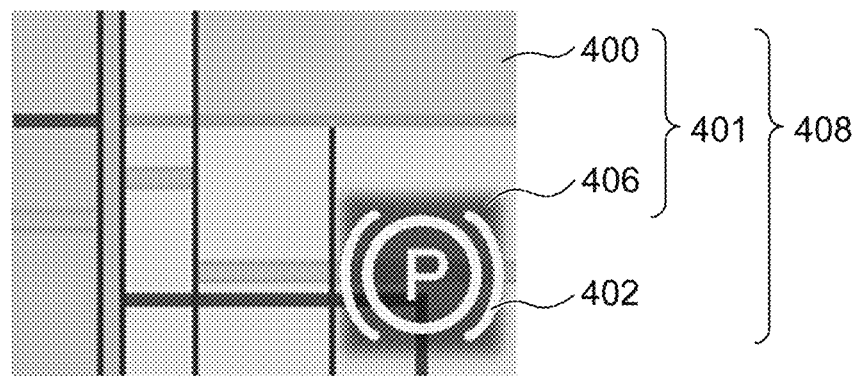

FIG. 4A through FIG. 4C are diagrams for explaining the generation of the image data 408 by the semiconductor apparatus 300 shown in FIG. 3. In FIG. 4A, the video data 400, the OSD character 402, and the intermediate layer 406 are shown. The intermediate layer 406 may be drawn in a single color. The color of the intermediate layer 406 will be referred to as a "separation color". As the separation color, a color that provides improved visibility of the OSD character 402 is preferably selected.

FIG. 4B shows an image 401 in which the intermediate layer 406 is drawn in the target region 404 of the video data 400. FIG. 4C shows an image 408 in which the OSD character 402 is overlaid on the image 401 shown in FIG. 4.

Figure 5B:
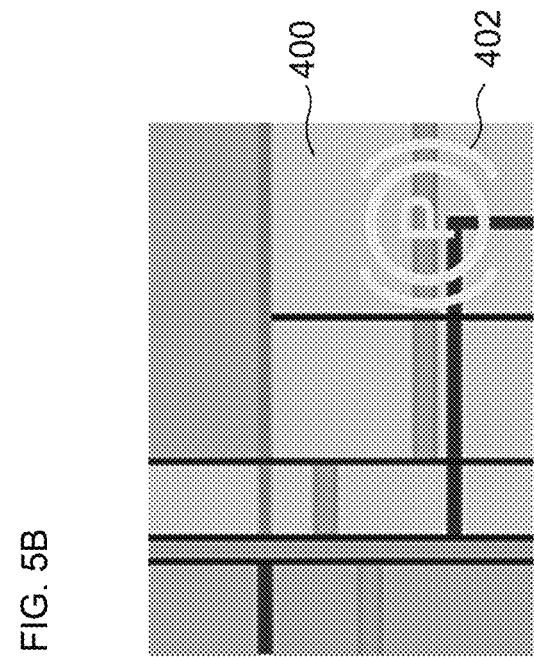
FIG. 5A and FIG. 5B are diagrams showing a case in which an intermediate layer is inserted and a case in which an intermediate layer is not inserted.
Figure 5A:
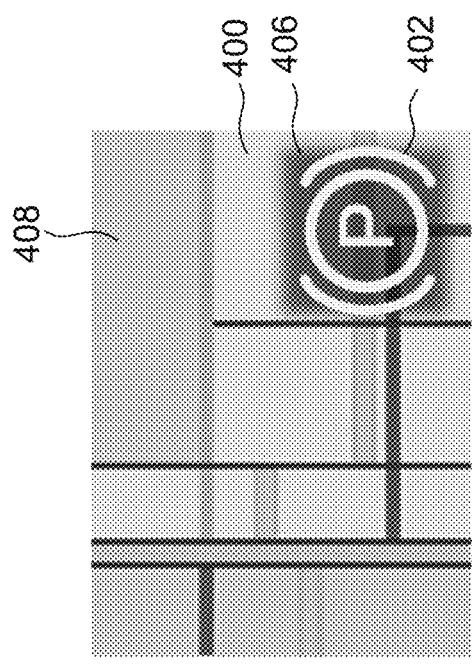

The above is the operation of the image display system 100. Next, description will be made regarding the effects thereof. FIG. 5A and FIG. 5B show images in cases in which the intermediate layer 406 is inserted and is not inserted. As can be clearly understood based on a comparison between these images, with such an arrangement in which the intermediate layer 406 is inserted, this provides significantly improved visibility of the OSD character 402.

With the semiconductor apparatus 300 configured to support a function of inserting the intermediate layer 406 between the video data 400 and the OSD character 402, such an arrangement provides improved visibility. This allows the operations of the graphics controller 110 to be reduced.

The present disclosure encompasses various kinds of apparatuses and methods that can be regarded as a block configuration or a circuit configuration shown in FIG. 3, or otherwise that can be derived from the aforementioned description. That is to say, the present disclosure is not restricted to a specific configuration. More specific description will be made below regarding example configurations or examples for clarification and ease of understanding of the essence of the present disclosure and the operation thereof. That is to say, the following description will by no means be intended to restrict the technical scope of the present disclosure.

FIG. 6 is a block diagram showing an example configuration of the OSD circuit 330. The OSD circuit 330 draws the intermediate layer 406 on the video data 400 using alpha blending in order to naturally blend the intermediate layer 406 on the video data 400.

The OSD circuit 330 includes memory 332, an encoder 334, a decoder 336, a separation color combining unit 340, and an OSD combining unit 350.

The memory 332 stores data that describes the OSD character 402. In the setup period in the startup operation of the semiconductor apparatus 300, the host processor may transmit bitmap data $S_4$ of multiple OSD characters 402 to the control input interface 320 of the semiconductor apparatus 300. In this stage, the host processor may preferably transmit each OSD character 402 and the corresponding separation data to the semiconductor apparatus 300.

The encoder 334 compresses (encodes) the bitmap data $S_4$ of the OSD character thus received in a predetermined format, and stores the compressed data $S_5$ in the memory 332. The compression format is not restricted in particular. For example, run-length compression or the like may be employed. The separation color information $S_6$ with respect to the OSD character is stored in the memory 332 in a form associated with the compressed data $S_5$. The separation color information $S_6$ may be embedded in the compressed data $S_5$.

When the control input interface 320 receives the display command $S_3$ for the OSD character in normal operation after the completion of the setup, the decoder 336 reads out the compressed data $S_5$ of the OSD character specified by the display command $S_3$ from the memory 332 and decodes the compressed data $S_5$. The bitmap data $S_7$ thus decoded is supplied to the OSD combining unit 350.

The separation color combining unit 340 draws the intermediate layer 406 in the target region 404 of the video data 400. The separation color combining unit 340 includes an alpha-value generating unit 342 and an alpha-blending unit 344. The alpha-value generating unit 342 generates an alpha-value distribution (alpha-value data) $S_8$ of the target region 404. The alpha-blending unit 344 applies a separation color $S_6$ to the target region 404 of the video data 400 based on the alpha-value data $S_8$.

The OSD combining unit 350 receives output data $S_9$ of the separation color combining unit 340. The output data $S_9$ corresponds to the image 401 shown in FIG. 4B.

The OSD combining unit 350 combines the bitmap data $S_7$ of the OSD character decoded by the decoder 336 and the output image $S_9$ of the separation color combining unit 340. The above is an example configuration of the OSD circuit 330.

Figure 7:
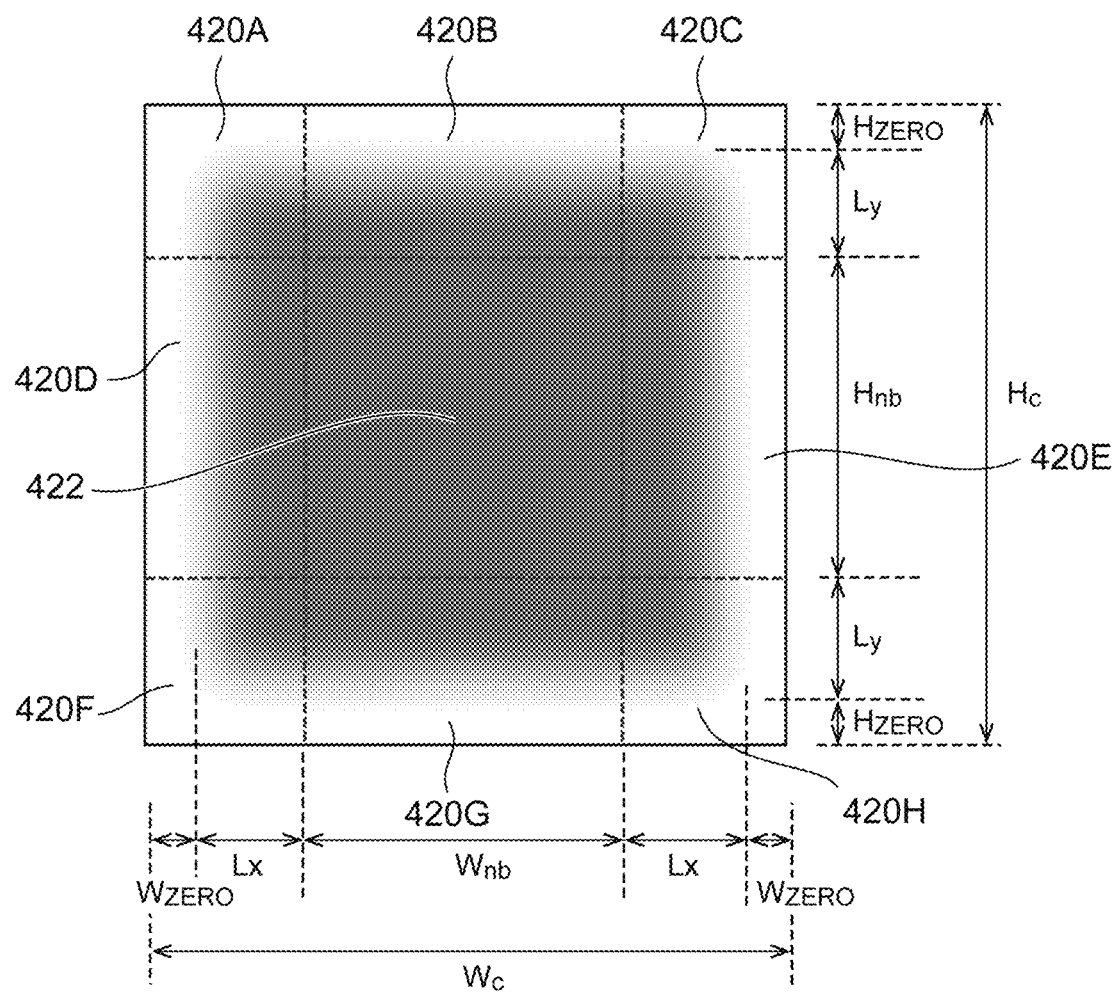
FIG. 7 is a diagram for explaining the generation of alpha-value data.

In a case in which the alpha-value distribution of the target region is stored in memory as bitmap data, such an arrangement requires a large memory capacity. Accordingly, the alpha-value generating unit 342 may preferably be configured to generate the alpha-value data $S_8$ by calculation. FIG. 7 is a diagram for explaining the generation of the alpha-value data $S_8$. FIG. 7 shows an alpha-value distribution in a grayscale form.

The target region 404 includes a blur region in which the alpha value is changed according to the position and a non-blur region 422 in which the alpha value is maintained so as to be constant. In a case in which the alpha value is configured as eight-bit data, the alpha value of the non-blur region 422 may be defined as the maximum value (255) that corresponds to a non-transparent state. The rectangular non-blur region 422 is arranged at a central position of the target region 404. Furthermore, the blur region 420 is arranged such that it surrounds the non-blur region 422. It should be noted that the blur region 420 may include a region with an alpha value of 0, i.e., may include a transparent region.

The blur region 420 can be divided into eight regions 420A through 420H. The pair of regions 420B and 420G are generated so as to be vertically symmetrical. Furthermore, the pair of regions 420D and 420E are generated so as to be horizontally symmetrical.

Furthermore, the regions (corner regions) of the four corners, i.e., 420A, 420C, 420F, and 420H, are generated so as to be horizontally symmetrical and/or vertically symmetrical with one from among the four corner regions as a reference (reference region). For example, the upper-left region 420A may be employed as the reference region.

In the regions 420B and 420G, the points represented by the same y coordinate position have the same alpha values. In other words, in the regions 420B and 420G, the alpha values are arranged such that they exhibit the same distributions in the y direction (which will be referred to as a "y-direction distribution Dy") and such that the alpha-value distributions have opposite slopes. In the same manner, in the regions 420D and 420E, the points represented by the same x coordinate position have the same alpha values. In other words, in the regions 420D and 420E, the alpha values are arranged such that they exhibit the same distributions in the x direction (which will be referred to as a "x-direction distribution Dx") and such that the alpha-value distributions have opposite slopes.

The alpha-value distribution in the reference region 420A is generated by calculation based on the y-direction distribution and the x-direction distribution. The alpha-value distributions of the other three corner regions 420C, 420F, and 420H can be generated by reversing or rotating the alpha-value distribution of the reference region 420A.

That is to say, in order to generate the alpha-value data $S_8$, only the y-direction distribution Dy and the x-direction distribution Dx of the blur region are required to be held, thereby allowing the memory capacity to be significantly reduced. In a case in which the y-direction distribution Dy and the x-direction distribution are designed as the same distribution, i.e., in a case in which Dx=Dy, this allows the memory capacity to be further reduced.

Figure 8:
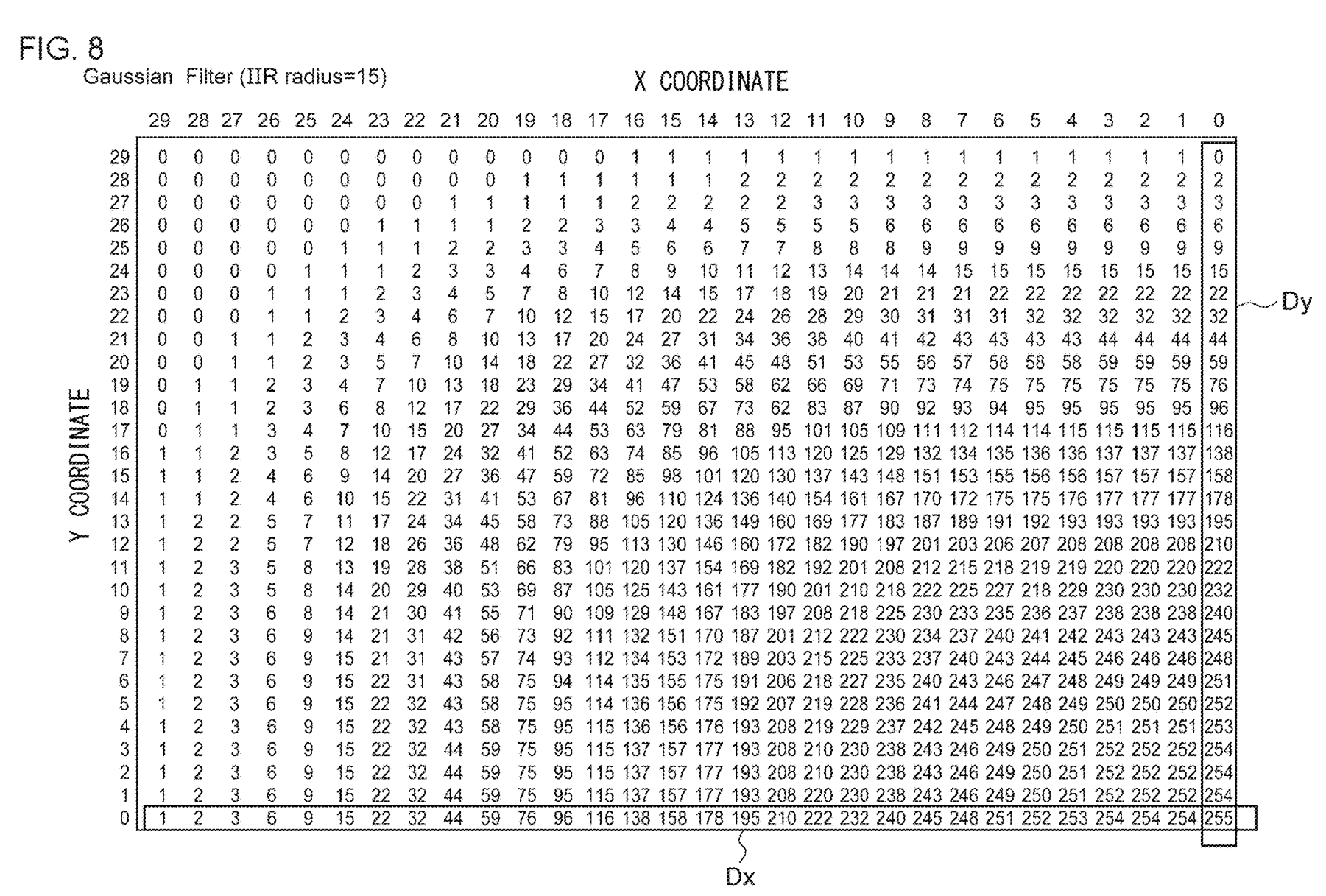

Next, description will be made regarding the generation of the distribution of the reference region 420A. FIG. 8 is a diagram showing an example of the alpha-value distribution of the reference region 420A. In FIG. 8, regions in which the alpha value is set to zero are not shown.

The alpha-value distribution shown in FIG. 8 is generated based on a Gaussian filter. Here, the alpha-value distribution is shown with the lower-right corner of the reference region 420A as the origin of the coordinate axes. It should be noted that the filter characteristics are not restricted to those of the Gaussian filter. Also, various kinds of filters such as a trigonometric filter may be employed.

Description will be made with the i-th element of the x-direction distribution Dx[0:29] as Dx[i], and with the j-th element of the y-direction distribution Dy[0:29] as Dy[j]. In this example, the relations 0≤i≤29 and 0≤j≤29 hold true. Each element and each alpha value are each represented by an 8-bit value (0 to 255). The alpha value α[i, j] at an arbitrary coordinate position (i, j) can be represented by the following Expression (1).

$$\alpha[i,j]=Dx[i] \times Dy[j]/256 \qquad (1)$$

In a case in which Dx, Dy, and the alpha value are each designed as a k-bit value, a maximum value of $2^k-1$ is defined for them. In this case, the following generalized expression (2) can be obtained.

$$\alpha[i,j]=Dx[i] \times Dy[j]/2^k \qquad (2)$$

With Dx as row data and with Dy as column data, the alpha-value generating unit 342 multiplies the column data Dx by the row data Dy and divides the product by a predetermined value $2^k$ (i.e., normalization) so as to generate the alpha-value distribution. In a case in which Dx and Dy are designed as the same data as described above, with both the row data and the column data as D, the following Expression (3) is obtained.

$$\alpha[i,j]=D[i] \times D[j]/2^k \qquad (3)$$

Figure 9A:
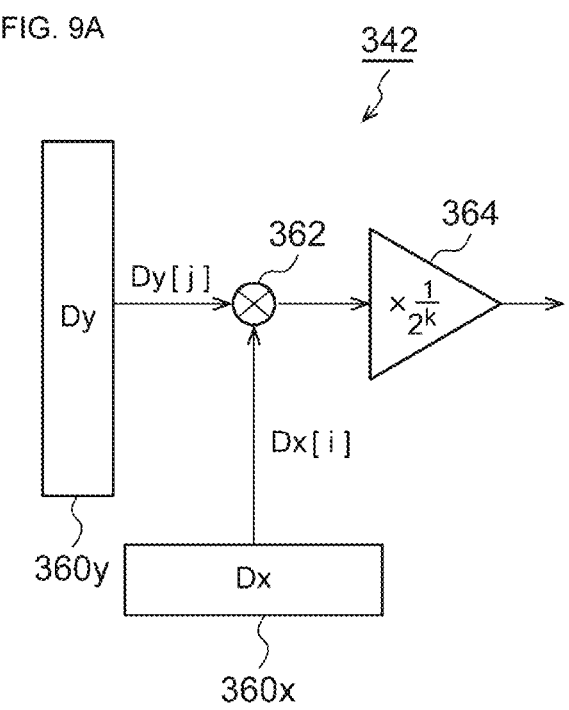
FIG. 9A and FIG. 9B are circuit diagrams each showing an example configuration of an alpha-value generating unit.
Figure 9B:
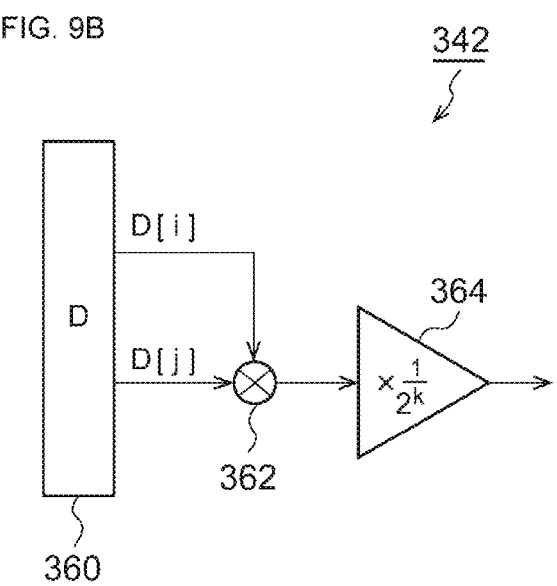

FIG. 9A and FIG. 9B are circuit diagrams each showing an example configuration of the alpha-value generating unit 342. In FIG. 9A, the memory 360x and 360y hold the x-direction distribution Dx and the y-direction distribution Dy each configured as a one-dimensional distribution. A multiplier 362 multiplies the i-th element Dx[i] of the x-direction distribution Dx and the element Dy[j] of the y-direction distribution Dy. Division by a predetermined value, i.e., by $2^k$, can be supported as a k-bit shift. Accordingly, this function can be supported by a bit shifter 364, thereby suppressing an increase in the circuit area. FIG. 9B shows an example in which Dx=Dy, which allows the memory capacity to be reduced.

Description will be made returning to FIG. 7. In some cases, multiple kinds of OSD characters having different sizes are employed. Description will be made with the width of the character as Wc, and with the height thereof as Hc. Also, description will be made with the width of the non-blur region 422 as Wnb, and with the height thereof as Hnb. Also, description will be made with the length of the one-dimensional alpha-value distribution Dx as Lx, and with the length of Dy as Ly (Lx may be equal to Ly). Also, description will be made with the width of an outer circumferential region of the target region 404 in which each position exhibits an alpha value of zero as $W_{ZERO}$, and with the height thereof as $H_{ZERO}$. In this case, the following Expressions hold true.

$$Wc=Wnb+2 \times (Lx+W_{ZERO})$$

$$Hc=Hnb+2 \times (Ly+H_{ZERO})$$

Accordingly, such an arrangement using Wnb and $W_{ZERO}$ as its parameters is capable of supporting the OSD characters having different sizes in the width direction. Similarly, such an arrangement using Hnb and $H_{ZERO}$ as its parameters is capable of supporting the OSD characters having different sizes in the height direction.

It should be noted that multiple items of one-dimensional data Dx and Dy that support different lengths Lx and Ly may be prepared. With such an arrangement, an appropriate one-dimensional data may be selected according to the size of each OSD character.

Figure 10:
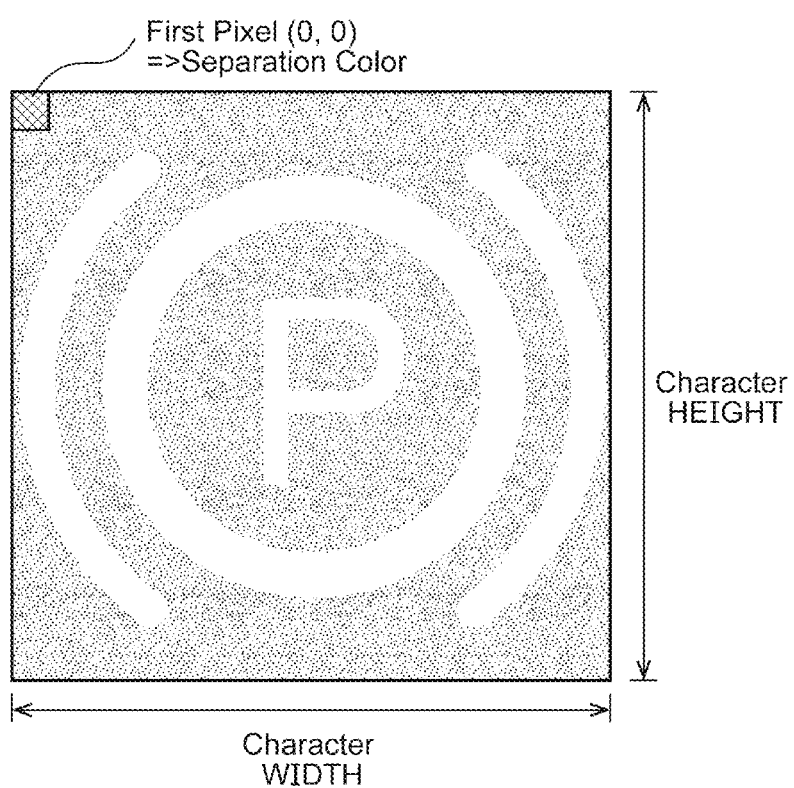
FIG. 10 is a diagram showing bitmap data of an OSD character in which a separation color is embedded.

Description will be made regarding the specification of the separation color. In many cases, the OSC characters each have a margin as their outer circumferential portion. Accordingly, the pixel for which the separation color is to be specified may be embedded in the margin of the OSD character. FIG. 10 is a diagram showing bitmap data of the OSD character in which the separation color is embedded. For example, such a pixel of the separation color is arranged at a first bit (upper-left position) of the bitmap data of the OSD character. This allows the designer of the display system to specify the separation color so as to provide improved visibility giving consideration to the color of the OSD character when the designer designs the OSD character. With this, when the OSD character is to be displayed, the semiconductor apparatus 300 refers to a predetermined pixel of the bitmap of the OSD character, thereby allowing the separation color to be acquired.

Referring to FIG. 6, as described above, in the setup operation of the semiconductor apparatus 300, the host processor 120 supplies the bitmap data $S_4$ of the OSD character to the semiconductor apparatus 300. In this case, the bitmap data $S_4$ of the OSD character includes a pixel of the separation color as shown in FIG. 10. Subsequently, the encoder 334 shown in FIG. 6 compresses the entire bitmap data $S_4$ including the pixel of the separation color. In this stage, the separation color information $S_6$ is embedded in the compressed data $S_5$.

Before the OSD character is displayed, the decoder 336 decodes the compressed data $S_5$, and refers to the first pixel, thereby allowing the separation color to be acquired. The separation color information thus acquired is supplied to the alpha-blending unit 344.

The bitmap data $S_7$ supplied from the decoder 336 to the OSD combining unit 350 includes a pixel of the separation color as the first bit thereof. Accordingly, the OSD combining unit 350 excludes the first bit when drawing the OSD character.

Figure 11A:
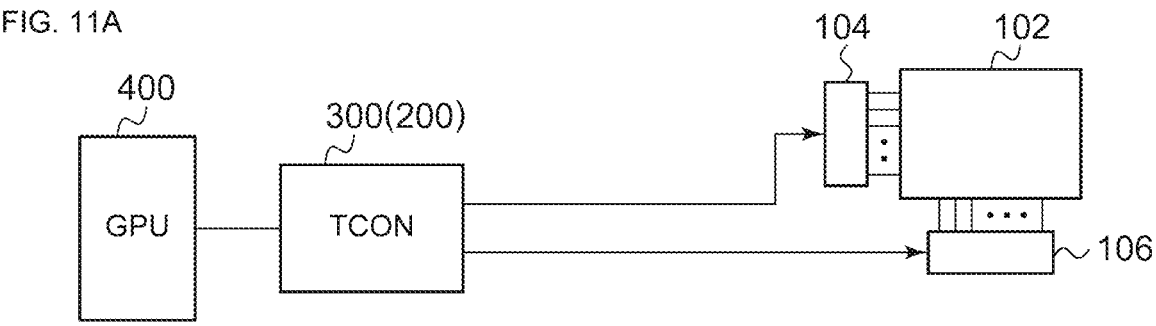
FIG. 11A through FIG. 11D are diagrams each showing a specific application of the semiconductor apparatus.

Next, description will be made regarding an application of the semiconductor apparatus 300. FIGS. 11A to FIG. 11D are diagrams each showing a specific application of the semiconductor apparatus 300. FIG. 11A shows the semiconductor apparatus 300 configured as a timing controller 200. The timing controller 200 receives the digital video signal $S_2$ from the graphics processor 110 so as to control the gate driver 104 and the source driver 106.

Figure 11B:
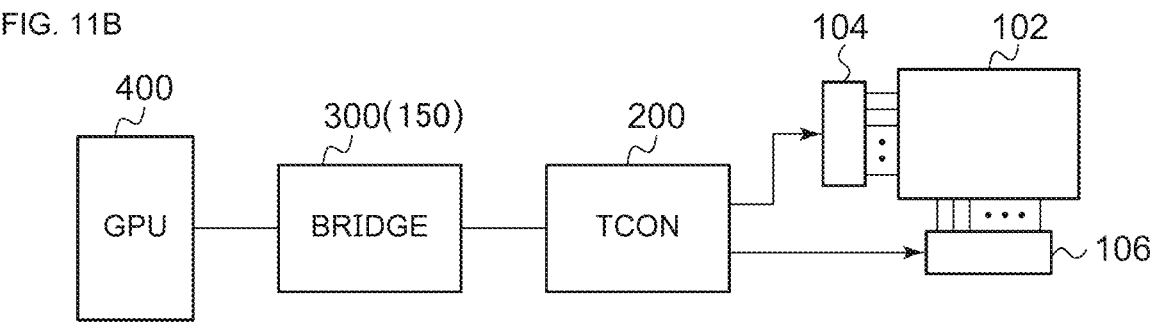

FIG. 11B shows the semiconductor apparatus 300 configured as a bridge chip 150. The bridge chip 150 is arranged between the graphics processor 110 and the timing controller 200. The bridge chip 150 functions as a bridge between an output interface of the graphics processor 110 and an input interface of the timing controller 200.

Figure 11C:
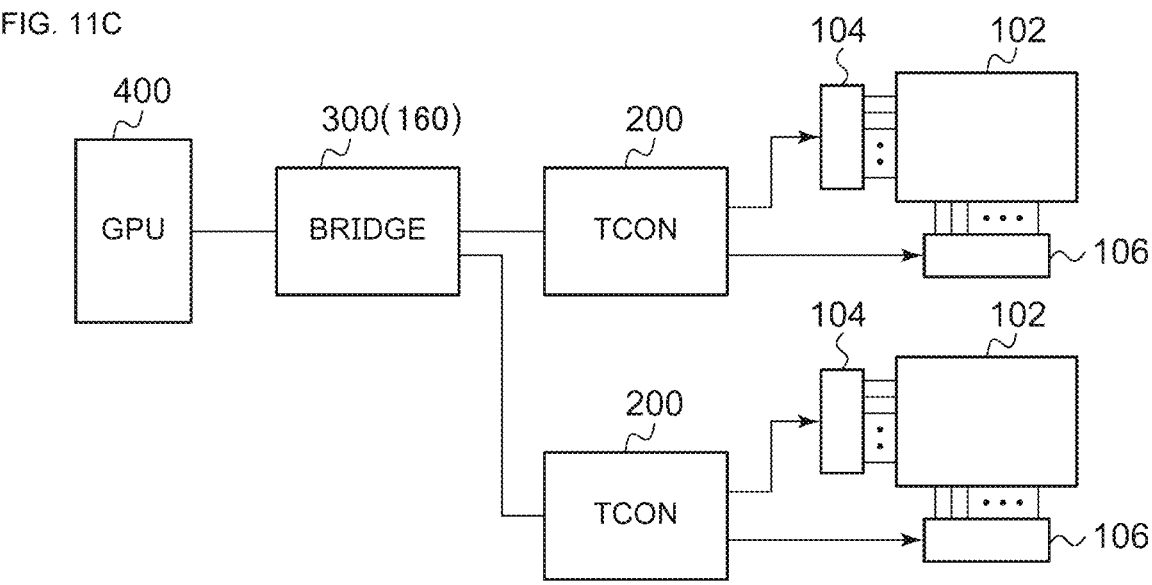

FIG. 11C shows the semiconductor apparatus 300 configured as a bridge chip 160. The bridge chip 160 branches a video signal received from the graphics processor 110 into multiple lines. The bridge chip 160 may distribute the same video signal as the input video signal to multiple lines. Alternatively, the bridge chip 160 may divide the input video signal into multiple regions (screens), and may distribute the multiple regions thus divided to respective multiple lines.

Figure 11D:
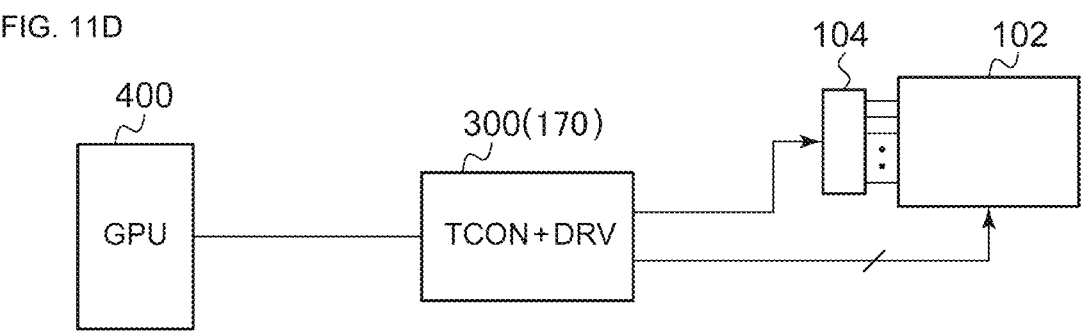

FIG. 11D shows the semiconductor apparatus 300 configured as a one-chip driver 170. The one-chip driver 170 is provided with a function of a timing controller and a function of a display driver (source driver).

The image display systems shown in FIGS. 11A to FIG. 11D can be employed for various kinds of display apparatuses such as in-vehicle displays, medical displays, TVs, PC displays, etc. Also, such an image display system may be built into various kinds of electronic devices such as laptop computers, tablet terminals, smartphones, digital still cameras, digital video cameras, etc.

Figure 12A:
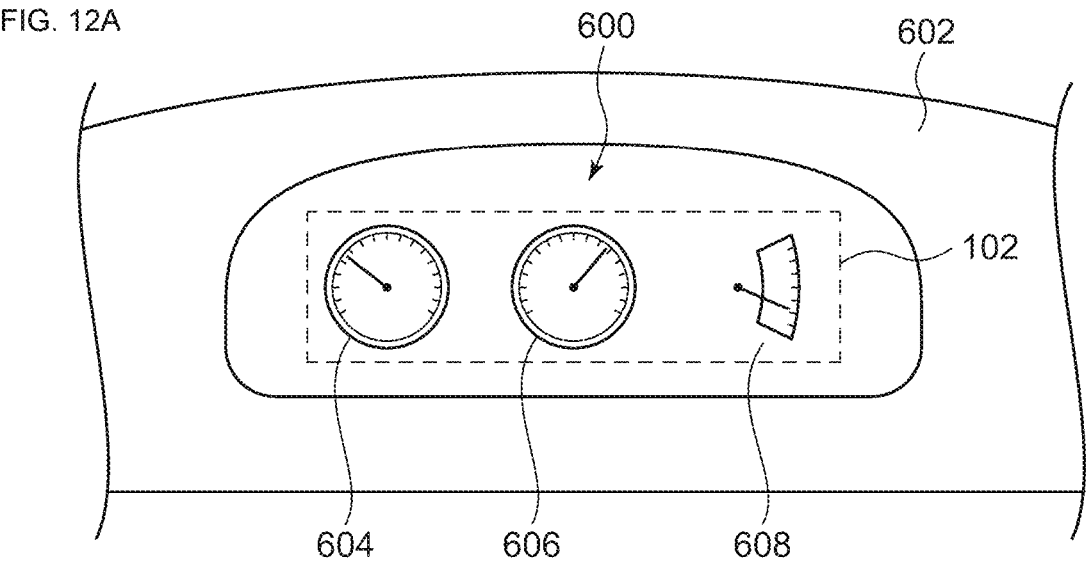
FIG. 12A-FIG. 12C are diagrams for explaining an in-vehicle display apparatus according to an embodiment.

FIG. 12A is a diagram showing an in-vehicle display apparatus 600 according to an embodiment. The in-vehicle display apparatus 600 is embedded in a console 602 arranged in the front of a cockpit. The in-vehicle display apparatus 600 receives a digital video signal (video data) $S_1$ including speedometer data 604, tachometer data 606 that indicates the rotational speed of an engine, remaining fuel data 608, and remaining battery charge data in a case in which the vehicle is configured as a hybrid vehicle or an electronic vehicle, etc., and displays the items to be displayed (FIG. 12A).

Figure 12B:
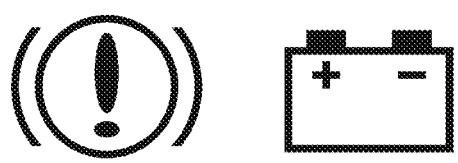

With conventional arrangements, as shown in FIG. 12B, indicator lamps or warning lamps that indicate some kind of abnormal state or that a battery has run out (which will be collectively referred to simply as the "warning lamps" hereafter) are provided as individual LEDs each configured as an external component of the display panel. The reason why such a warning lamp is not displayed on the display panel is as follows. That is to say, the semiconductor apparatus 300 (timing controller 200) and the graphics controller 110 are coupled via a differential serial interface. During a period from the start-up operation of the system up to the link establishment supported by the serial interface between the timing controller 200 and the graphics controller 110, such an arrangement is not able to transmit image data. Accordingly, in this period, no image can be displayed on the display panel 102. Also, if link disconnection occurs due to noise effects or the like after the link has been established, such an arrangement is not able to display any image on the display panel 102 before the link is established again. Also, the same problem occurs when a cable is detached or disconnected, or when a malfunction occurs in a part of the serial interface or the graphics controller 110. Such a state in which an image cannot be displayed will be referred to as a "non-displayable state".

A warning lamp notifies the driver of important information. Accordingly, such a warning lamp is required to operate even in the non-displayable state. Giving consideration to such a situation, such a warning lamp is required to be provided as an external component of the display panel.

In contrast, with the timing controller 200 according to the embodiment or with other embodiments of the semiconductor apparatus 300, such an arrangement allows such a warning lamp to be displayed on the display panel using the OSD function. This is because such an OSD display function does not require the communication supported by the differential serial interface. This arrangement requires no LED and a driving circuit thereof, thereby providing reduced costs. Furthermore, such an arrangement requires only an ECU standard function such as $I^2C$ or the like, thereby providing further reduced costs.

Figure 12C:
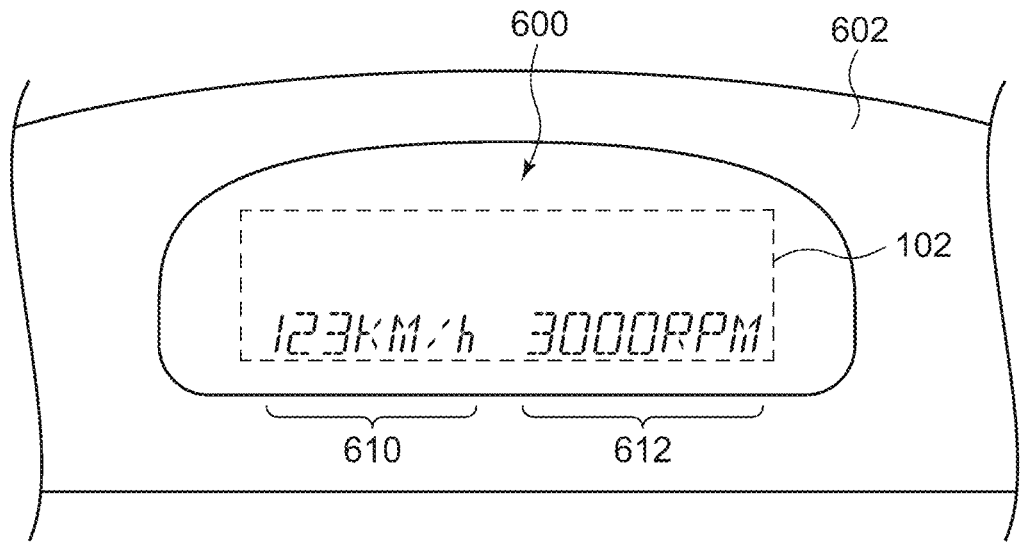

Also, when a situation (non-displayable state) in which the video data $S_1$ cannot be displayed occurs in the in-vehicle display apparatus 600, the display panel 102 blacks out, leading to difficulty in driving the vehicle. In order to solve such a problem, alphabetic and numeric characters may be prepared in the form of OSD characters. When the speedometer 604 or tachometer 606 cannot be displayed due to the occurrence of some kind of abnormal state during driving of the vehicle, this arrangement is capable of displaying the vehicle speed information 610 and the engine rotational speed information 612 in a real-time manner using the OSD function as shown in FIG. 12C, thereby providing improved safety.

Also, when the user turns on the ignition of the vehicle, in the start-up operation of the in-vehicle display apparatus 600, such an arrangement allows a given character string such as "PLEASE WAIT . . . ", a character string that represents the current time, or the like, to be displayed using the OSD function before the video data $S_1$ can be displayed.

Also, the timing controller 200 configured as an embodiment of the semiconductor apparatus 300 may be employed in a medical display apparatus. The medical display apparatus displays necessary information for medical doctors and nurses in a medical examination, medical treatment, or surgery. The timing controller 200 allows such a medical display apparatus to display important information (e.g., the heart rate, blood pressure, and the like, of a patient) using the OSD function even in a situation in which the video data $S_1$ cannot be displayed.

Figure 13:
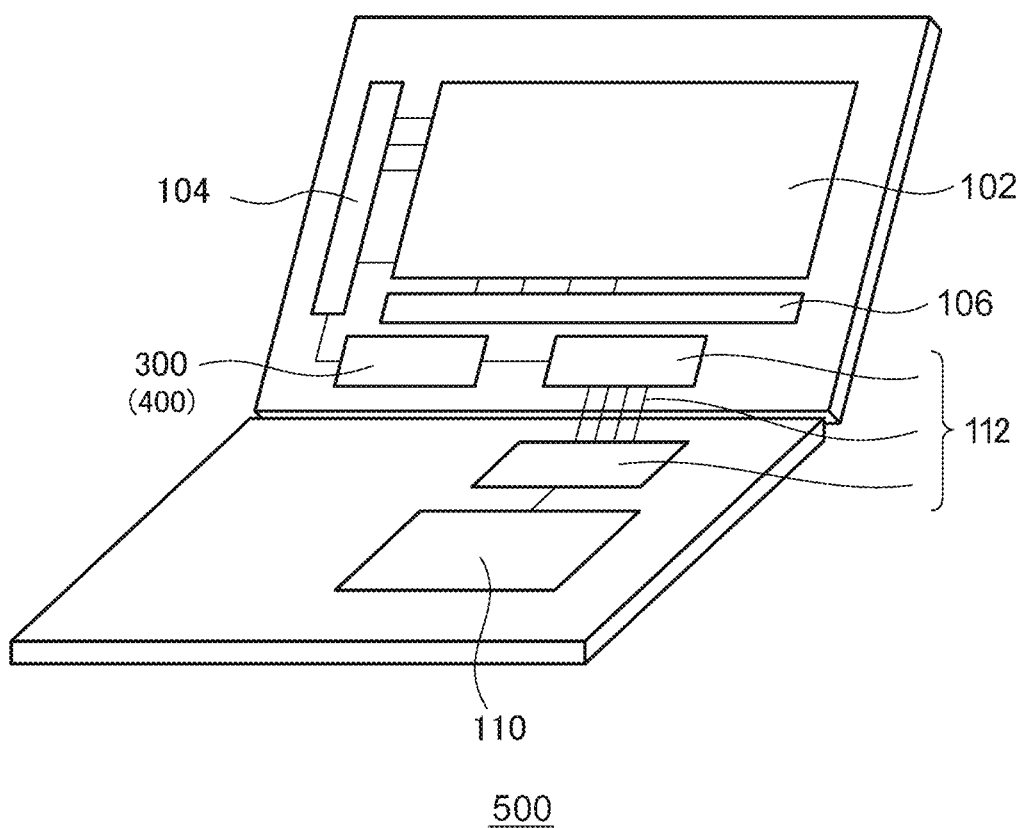
FIG. 13 is a perspective view showing an electronic device.

FIG. 13 is a perspective view showing an electronic device 500. The electronic device 500 shown in FIG. 13 may be configured as a laptop computer, a tablet terminal, a smartphone, a portable game machine, an audio player, or the like. The electronic device 500 includes a graphics controller 110, a display panel 102, a gate driver 104, and a source driver 106, each of which is built into a housing 502. A transmission apparatus 112 including a differential transmitter, a propagation path, and a differential receiver may be arranged between the timing controller 200 and the graphics controller 110.

Description has been made above regarding the present disclosure with reference to the embodiment. The above-described embodiment has been described for exemplary purposes only, and is by no means intended to be interpreted restrictively. Rather, it can be readily conceived by those skilled in this art that various modifications may be made by making various combinations of the components or processes, which are also encompassed in the technical scope of the present disclosure. Description will be made below regarding such modifications.

Modification 1

Description has been made in the embodiment regarding an arrangement in which the alpha-value distribution of the reference region 420A is generated by calculation. However, the present disclosure is not restricted to such an arrangement. For example, the alpha-value distribution may be generated beforehand in the design stage of the semiconductor apparatus 300. The alpha-value distribution thus generated beforehand may be stored in memory in a non-volatile manner.

Modification 2

In an embodiment, the separation color combining unit 340 may dynamically select the separation color. For example, the separation color combining unit 340 holds a table or calculation expressions for describing the correspondence relation between the color of the OSD character and the separation color. With such an arrangement, when an instruction is issued to display the OSD character, the color of the OSD character may be acquired, and the corresponding separation color may be determined.

Modification 3

Description has been made in the embodiment regarding an arrangement in which, in the setup operation of the semiconductor apparatus 300, the OSD characters are loaded to the semiconductor apparatus 300 from an external circuit. However, the present disclosure is not restricted to such an arrangement. Also, the semiconductor apparatus 300 may be provided with nonvolatile memory as its internal (or external) component that can be directly accessed by the semiconductor apparatus 300. Also, the nonvolatile memory may hold the OSD characters. In this case, loading of the OSD characters is not required in the setup operation.

Description has been made regarding the present disclosure with reference to the embodiments using specific terms. However, the above-described embodiments show only the mechanisms and applications of the present disclosure for exemplary purposes only, and are by no means intended to be interpreted restrictively. Rather, various modifications and various changes in the layout can be made without departing from the spirit and scope of the present disclosure defined in appended claims.

What is claimed is:

1. A semiconductor apparatus comprising:
    a video input interface structured to receive video data;
    an on-screen display (OSD) circuit structured to draw an intermediate layer in a target region in which an OSD character is to be overlaid on the video data, and to overlay the OSD character on the intermediate layer, wherein the OSD circuit draws the intermediate layer using alpha blending,
    wherein the OSD circuit comprises an alpha-value generating unit structured to generate a distribution of alpha values to be applied to the target region, and
    wherein the target region comprises: a non-blur region positioned at a central position of the target region and in which the alpha value is designed to be constant; and a blur region arranged such that it surrounds the non-blur region, and the alpha value becomes smaller closer to an outer circumferential portion thereof.

2. The semiconductor apparatus according to claim 1, wherein the alpha-value generating unit is structured to generate the alpha-value distribution of a reference region positioned at a first corner of the blur region,
    and wherein the alpha-value generating unit is structured to generate the alpha-value distribution for each of the remaining three corners of the blur region based on the alpha-value distribution of the reference region.

3. The semiconductor apparatus according to claim 1, wherein the alpha-value distribution of the blur region is configured as a Gaussian distribution.

4. The semiconductor apparatus according to claim 1, wherein the OSD character is supplied from an external component in a setup operation of the semiconductor apparatus.

5. The semiconductor apparatus according to claim 4, wherein a color of the intermediate layer is supplied to the semiconductor apparatus as appended data of a corresponding OSD character.

6. The semiconductor apparatus according to claim 5, wherein the color of the intermediate layer is embedded in a predetermined pixel positioned in a margin portion of bitmap data of the OSD character.

7. The semiconductor apparatus according to claim 1, wherein the OSD circuit selects the color of the intermediate layer according to the OSD character to be overlaid on the intermediate layer.

8. The semiconductor apparatus according to claim 1, structured as a timing controller.

9. The semiconductor apparatus according to claim 1, structured as a one-chip driver structured to have a function of a timing controller and a function of a source driver.

10. The semiconductor apparatus according to claim 1, structured as a bridge circuit having M inputs and N outputs (M≤1, N≤1).

11. An in-vehicle display system comprising the semiconductor apparatus according to claim 1.

12. An electronic device comprising the semiconductor apparatus according to claim 1.

13. A semiconductor apparatus comprising:
    a video input interface structured to receive video data;
    an on-screen display (OSD) circuit structured to draw an intermediate layer in a target region in which an OSD character is to be overlaid on the video data, and to overlay the OSD character on the intermediate layer, wherein the OSD circuit draws the intermediate layer using alpha blending,
    wherein the OSD circuit comprises an alpha-value generating unit structured to generate a distribution of alpha values to be applied to the target region, and
    wherein the alpha-value generating unit is structured to generate at least a part of the alpha-value distribution of the target region by multiplying column data and row data, and by dividing a product thereof by a predetermined value.

14. The semiconductor apparatus according to claim 13, wherein the predetermined value is $2^k$ (k≥2), and wherein the division is configured as a k-bit shift.

* * * * *